3,110,649
ANTICOCCIDIAL COMPOSITIONS COMPRISING 5 - NITROFURFURYLIDENECARBAZATES AND METHOD OF USING SAME
Cornell Alvin Johnson, Norwich, N.Y., assignor to The Norwich Pharmacal Company, a corporation of New York
No Drawing. Filed June 13, 1960, Ser. No. 35,424
7 Claims. (Cl. 167—53.1)

This invention relates to therapeutics and aims to provide new compositions having therapeutic properties and new methods of combatting disease therewith. It is more particularly concerned with anticoccidial compositions comprising 5-nitrofurfurylidenecarbazates adapted for administration to poultry in the form of feed or drinking water and the control of coccidiosis in chickens through their use.

The disease of poultry commonly referred to as "coccidiosis" is widespread. It is caused by species of the genus Eimeria. A particularly troublesome member is *Eimeria tenella* which lodges in the cecum of chickens and is responsible for severe and oftentimes fatal infection. The morbidity and mortality occasioned by this infection create an extensive economic loss in poultry flocks if left untreated or unchecked. Particularly obnoxious in connection with this disease is the appearance of "bloody droppings" from chickens provoked by rupture of their cecal muscosal tissue.

In the last decade, several drugs have been developed which possess anticoccidial properties but none of them is without some shortcoming. Apart from anticoccidial activity per se, other factors such as tolerability at effective dose levels of the drug, feed efficiency and conversion resulting when a drug-containing diet is employed, emergence of drug-resistance mutants, effect of drug on egg production and hatchability, permissive development of natural immunity in the presence of drug, activity at tolerable levels to combat and overcome massive infections sometimes encountered and economy of treatment must be considered.

I have discovered that it is possible to combat coccidiosis in poultry by means of certain 5-nitrofurfurylidenecarbazates which can be combined with feedstuff or incorporated in the drinking water offered to poultry so that such feedstuff or drinking water serves as an inert carrier therefor. These nitrofurans are fully tolerable at effective dose levels; can be employed for extensive time periods with generally beneficial effect upon the growth and development of the birds; are substantially non-toxic; and are comparatively inexpensive. They are readily consumed by poultry when combined with poultry feed or when incorporated in the drinking water supply. These nitrofurans which I employ in the practice of my invention may be represented by the following formula:

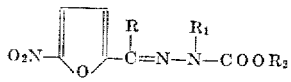

in which R is selected from the group consisting of hydrogen and methyl; $R_1$ from the group consisting of hydrogen, methyl and hydroxyethyl; and $R_2$ from the group consisting of $-C_2H_5$, $-CH_2CH_2OH$,

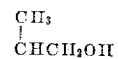

$CH_2CHOHCH_2OH$ and $-CH_2CH_2Cl$.

While each of the 5-nitrofurfurylidenecarbazates included within the series employed in the practice of my invention is distinguished by its anticoccidial activity, the respective members of the series differ from each other somewhat in degree of anticoccidial effectiveness. The member which I now prefer to use is 2-hydroxyethyl 5-nitrofurfurylidenecarbazate.

In accordance with my invention, the selected member of the series is intimately admixed, as the active ingredient, with an inert carrier. Commonly used solid carriers include ground oyster shells, Attapulgus clay, commercial poultry feeds, urea, corn meal, ground corn, citrus meal, fermentation residues and distiller's grains. In the practice of this embodiment of my invention, the mixing of the active ingredient with a carrier is accomplished by commonly used methods such a stirring, tumbling and grinding. In this way it is possible to prepare compositions of varying concentration to suit particular needs or desires. Premixes may be prepared which contain from 1% to 50% by weight of the active ingredient. Such concentrates can be added to and thoroughly distributed in poultry rations to provide desirable drug levels of from 0.0055% to 0.022% by weight.

In the practice of my invention, wherein a solid carrier is employed, I prefer to employ a composition comprising a poultry feedstuff having incorporated therein an effective amount of active ingredient.

For the prophylactic control of coccidiosis the amount of active ingredient is extremely low, a daily intake of 0.005% by weight of the food consumed serving well. However, for optimum results, I prefer a level within the range of about 0.0075% to 0.011% by weight. In the event a fulminating outbreak of the disease is encountered, higher concentrations of the order of about 0.015% to about 0.022% by weight may be employed.

In the practice of my invention wherein the drinking water supply is employed as a carrier, I prefer a concentration of active ingredient of about .0055%–.0075% by weight. This embodiment of my invention is especially valuable and desirable when birds are "off feed" yet continue normal water intake.

The 5-nitrofurfurylidenecarbazates which I employ in the practice of my invention can be readily and very economically obtained. Their preparation involves the interaction of a 5-nitro-2-carbonylfuran, or a functional derivative thereof readily hydrolyzable thereto, with the appropriate carbazate or a carbonyl condensation product thereof whose carbonyl group is readily exchanged for the 5-nitro-2-furan carbonyl group. The intermediate carbazate may be produced in facile manner.

Methods which may be employed for the production of the intermediate carbazates comprise the following:

A. Hydrazine hydrate, or a substituted hydrazine containing a reactive hydrogen group; e.g. benzaldehyde 2-hydroxyethyl hydrazone, is caused to react with an alkoxycarbonylating agent such as an alkyl carbonate, alkylene carbonate or alkyl chlorocarbonate by bringing the reactants together with thorough mixing and, if desired, in the presence of an inert reaction medium such as methanol. Heat may be supplied to the mixture, if desired, to speed up the reaction.

The reaction product may be isolated, if desired, by cooling the reaction mixture or by distilling to lesser volume followed by cooling. The precipitated product is recovered by filtration.

B. The nitration of an N-substituted carbamic acid ester followed by reduction of the nitro group serves to produce a 2-substituted carbazate. Fuming nitric acid is a suitable nitrant. Reduction is readily carried out. This may be accomplished electrolytically using, for instance, a mercury pool cathode, a lead anode and a catholyte of 10% sulfuric acid.

The intermediate carbazates are readily converted to their nitrofurfurylidene derivatives by reaction with 5-nitro-2-furancarbonyl compounds such as 5-nitro-2-furaldehyde, methyl 5-nitro-2-furyl ketones or a functional derivative thereof readily hydrolyzable thereto such as the diacetate or oxime. Preferably a solution of the nitrofuran carbonyl compound dissolved in a solvent such as ethanol is added to an aqueous solution of the carbazate, the mixture heated briefly in the presence of dilute acid, e.g. sulfuric, acetic, hydrochloric; cooled; and the precipitated product filtered and dried.

The hydroxylated carbazates are readily converted to the corresponding chloro derivative by treatment with a halogenating agent such as thionyl chloride, phosphorous oxychloride and the like.

In order that the preparation of the 5-nitrofurfurylidenecarbazates employed as the active ingredient in my anticoccidial composition may be readily available to and understood by those skilled in the art of the following illustrative examples are subjoined:

EXAMPLE I

Ethyl 5-Nitro-2-Furfurylidenecarbazate

A solution of 9.4 g. 5-nitro-2-furaldehyde in 200 ml. of 95% ethanol is added to a solution of 7 g. of ethyl carbazate (Ber. 47, 2186 (1914)) in 15 ml. water. The solution is warmed about fifteen minutes on the steam bath; diluted with 40 ml. water; and then cooled. The yellow precipitate of N-(5-nitro-2-furfurylidene) carbazate is collected on a Büchner funnel and dried. The yield is 15.2 g. (99%). The product may be recrystallized from 95% alcohol, M.P. 173–173.5° C.

EXAMPLE II

Ethyl 2-[1-(5-Nitro-2-Furyl)-Ethylidene] Carbazate

A solution of 13 g. (.084 mole) of methyl 5-nitro-2-furyl ketone in 250 cc. of ethanol is added a solution of 8.8 g. (.0845 mole) of ethyl carbazate in 60 cc. water. The solution is heated on the steam bath for 30 minutes; then 110 cc. water are added and the mixture chilled. 19.3 g. (95%) of yellow crystals, M.P. 193–195°, are filtered off and dried. Recrystallization from ethanol (50 cc./g.) gave an 86% recovery of material melting at 195–196°.

EXAMPLE III

Ethyl 1-Methyl-2-(5-Nitro-2-Furfurylidene) Carbazate

A. ETHYL N-METHYL N-NITRO CARBAMATE (1)

Fifty grams of ethyl N-methyl carbamate is added over a period of fifteen minutes to 100 ml. fuming nitric acid. The internal temperature is maintained at 55° C. by the intermittent application of an ice water bath. Stirring is continued an additional one-half hour. The reaction mixture is then poured into 500 ml. ice water. A colorless oil separates which finally turns yellow on standing. The oil is extracted with ether. The combined ether extracts are washed with saturated aqueous sodium bicarbonate solution, and with water. After the extract has been dried over anhydrous calcium sulfate the ether is removed by distillation. The residue is distilled in vacuo, 92–93° 12 mm., yield 55 g. (76%).

B. ETHYL 1-METHYL-2-(5-NITRO-2-FURFURYLIDENE) CARBAZATE

A solution of 11.35 g. (.0795 mole) of I is reduced electrolytically in a cell consisting of: cathode, mercury pool of 61 cm.²; catholyte, 500 ml. 10% $H_2SO_4$ with stirrer; anode, lead in two porous cups containing 10% $H_2SO_4$. A current of 12.5 amperes is maintained for 77 min. (theory 61.5 min.); current density, 0.205 amp./cm.². The temperature of the catholyte is kept at 5–10° C. with suitable cooling of the cell. At the end of the reduction the catholyte is filtered and to the clear filtrate is added a solution of 8 g. 5-nitro-2-furaldehyde in 50 ml. of 95% ethanol. After one hour, the yellow precipitate of ethyl 1-methyl-2-(5-nitro-2-furfurylidene) carbazate is collected in a Büchner funnel, and washed with water and with alcohol. The yield is 14.1 g. (73.5%). The product may be recrystallized from alcohol (M.P. 145–146° C.).

EXAMPLE IV

Ethyl 1-(2-Hydroxyethyl)-2-(5-Nitro-2-Furfurylidene)-Carbazate

To 50 g. (.657 mole) of distilled hydroxyethylhydrazine in 125 cc. of ethanol is added during 5 minutes, 76 cc. of benzaldehyde in 125 cc. of ethanol while holding the temperature at 38–42°. This temperature is maintained for 30 minutes after addition is complete. During 40 minutes, 124 g. (1.14 moles) of ethyl chloroformate is dropped in at 35–40°. The reaction is stirred for 1 hour after addition is complete. The reaction mixture is quenched with 880 cc. water and the red oil separated. This oil is placed in a flask with 100 cc. of ethanol, a solution of 93 g. (.657 mole) of 5-nitro-2-furaldehyde in 100 cc. of ethanol added and the mixture refluxed 35 minutes. After charcoaling and filtering, the solution is filtered, slurred with ether and dried. There are obtained 71.5 g. (40%) of product, ethyl 1-(2 - hydroxyethyl) - 2 - (5 - nitro - 2 - furfurylidene) - carbazate, melting at 143–147°.

EXAMPLE V

2-Hydroxyethyl 5-Nitrofurfurylidenecarbazate

A. 900 g. of ethylene carbonate, dissolved in 1 l. of methanol, is added to 500 g. of hydrazine hydrate (100%) with stirring. The mixture is refluxed for 10 minutes. Upon cooling, the desired compound, 2-hydroxyethyl carbazate, crystallizes. This is filtered to yield the product (84% yield) having a melting point of 92–93° after recrystallization from methanol.

B. A solution of 141 g. of 5-nitro-2-furaldehyde in 1 l. of alcohol is added to 120 g. of 2-hydroxyethyl carbazate. A yellow crystalline compound precipitates, which is filtered. After washing with alcohol and water, the compound is dried. A yield of 96 to 97% of the desired substance, 2-hydroxyethyl 5-nitrofurfurylidenecarbazate is obtained having a melting point of 168° C.

EXAMPLE VI

2-Chloroethyl 5-Nitrofurfurylidenecarbazate

In a 250 cc. flask fitted with a reflux condenser is placed 60 cc. of thionyl chloride. To this is added 6 g. of the compound prepared in Example V. The mixture is refluxed for about 30 minutes. It is then chilled and the solid which precipitates is filtered, washed with benzene and alcohol and dried. There are obtained 5.9 g. of 2-chloroethyl 5-nitrofurfurylidenecarbazate, M.P. 204° C.

EXAMPLE VII

2-Hydroxy-1-Methylethyl 5-Nitrofurfurylidenecarbazate

A. A solution of 102 g. (1 mole) of propylene carbonate in 100 ml. of methanol is added over 8 minutes to 50 g. (1 mole) of 100% hydrazine hydrate and then heated at reflux for 20 minutes. After cooling overnight the precipitated solid is filtered; rinsed with a mixture of isopropanol and ether; and recrystallized twice from chloroform. The yield of 2-hydroxy-1-methylethyl carbazate is 22 g. (16.5%) (M.P. 89–92°).

B. A solution of 27 g. (0.2 mole) of the product of A in 100 ml. of alcohol is treated with a solution of 28 g. (0.2 mole) of 5-nitro-2-furaldehyde in 100 ml. of ethanol. After stirring for 15 minutes and cooling overnight, the precipitate is filtered and recrystallized from 550 ml. of isopropanol. The yield of 2-hydroxy-1-methylethyl 5-nitrofurfurylidene-carbazate is 40.5 g. (79%) (M.P. 155–175°).

EXAMPLE VIII

2,3-Dihydroxypropyl 5-Nitrofurfurylidenecarbazate

A. A solution of 118 g. (1 mole) of glycerine carbonate in 100 ml. of methanol is added with stirring to 50 g. (1 mole) of 100% hydrazine hydrate over 8 minutes and then heated at reflux for 15 minutes. On cooling the solution a white solid is precipitated. The solid is filtered; rinsed with a mixture of methanol and ether; and recrystallized from ethanol. The yield of product, 2,3-dihydroxypropyl carbazate, is 70 g. (47%) (M.P. 106–110°).

B. The product of A (50 g., 0.33 mole) in a mixture of 175 ml. of alcohol and 120 ml. of water is added to 47 g. (0.33 mole) of 5-nitro-2-furaldehyde in 175 ml. of ethanol. After warming on the steam bath the solution is concentrated in vacuo to a red oil which gradually crystallized on standing. The solid is triturated with isopropanol and then recrystallized from acetonitrile. The yield of product, 2,3 - dihydroxypropyl 5-nitrofurfurylidenecarbazate, is 38 g. (42%) (M.P. 138–140°).

What I claim is:

1. A composition having anticoccidial properties upon administration to poultry, comprising the combination of from about 0.0055% to about 0.022% weight thereof of a chemical compound represented by the formula

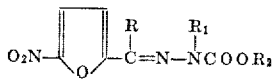

in which R is selected from the group consisting of H— and —CH$_3$; R$_1$ is selected from the group consisting of —H, —CH$_3$ and CH$_2$CH$_2$OH; and R$_2$ is selected from the group consisting of C$_2$H$_5$, —CH$_2$CH$_2$OH,

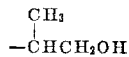

—CH$_2$CHOHCH$_2$ and CH$_2$CH$_2$Cl; and poultry feedstuff.

2. A composition having anticoccidial properties upon administration to poultry, comprising the combination with poultry feedstuff of from about 0.0055% to about 0.022% by weight thereof of ethyl 1-methyl-2-(5-nitrofurfurylidene)carbazate.

3. A composition having anticoccidial properties upon administration to poultry, comprising the combination of from 0.0055% to about 0.02% by weight thereof of 2-hydroxyethyl 5-nitrofurfurylidenecarbazate and poultry feedstuff.

4. A composition having anticoccidial properties upon administration to poultry, comprising the combination of from about 0.0055% to about 0.02% by weight thereof of 2-chloroethyl 5-nitrofurfurylidenecarbazate and poultry feedstuff.

5. A composition having anticoccidial properties upon administration to poultry, comprising the combination of from about 0.0055% to about 0.02% by weight thereof of 2-hydroxy 1-methylethyl 5-nitrofurfurylidenecarbazate and poultry feedstuff.

6. A composition having anticoccidial properties upon administration to poultry, comprising the combination of from about 0.0055% to about 0.02% by weight thereof of ethyl 5-nitrofurfurylidenecarbazate and poultry feedstuff.

7. The method of combatting coccidiosis which comprises administering to a host susceptible of and subject to such disease a composition consisting of a carrier selected from the group consisting of poultry feedstuff and poultry drinking water and having admixed therewith from about 0.0055% to about 0.022% by weight thereof of a chemical compound represented by the following formula:

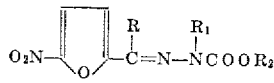

in which R is selected from the group consisting of H— and —CH$_3$; R$_1$ is selected from the group consisting of —H, —CH$_3$ and —CH$_2$CH$_2$OH; and R$_2$ is selected from the group consisting of —C$_2$H$_5$, —CH$_2$CH$_2$OH

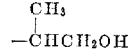

—CH$_2$CHOHCH$_2$OH and —CH$_2$CH$_2$Cl.

References Cited in the file of this patent

Tadashi: Chem. Abst., vol. 50, 1956, p. 972D.
Chem. Abst., vol. 52, 1958, pages 20388 and 20389b.

UNITED STATES PATENT OFFICE
CERTIFICATE OF CORRECTION

Patent No. 3,110,649                                November 12, 1963

Cornell Alvin Johnson

It is hereby certified that error appears in the above numbered patent requiring correction and that the said Letters Patent should read as corrected below.

Column 5, line 34, for "—$CH_2CHOHCH_2$" read
-- —$CH_2CHOHCH_2OH$ --.

Signed and sealed this 27th day of October 1964.

(SEAL)
Attest:

ERNEST W. SWIDER                                EDWARD J. BRENNER
Attesting Officer                                  Commissioner of Patents